United States Patent
Platzker et al.

(10) Patent No.: US 11,004,021 B2
(45) Date of Patent: May 11, 2021

(54) TRUSTED COLLABORATIVE COMMUNICATIONS BETWEEN ORGANIZATIONS

(71) Applicants: BlackBerry Limited, Waterloo (CA); ATHOC, Inc., San Mateo, CA (US)

(72) Inventors: Daniel Marcel Platzker, Saratoga, CA (US); Balasubrahmanyam Gattu, San Ramon, CA (US); Oded Yehuda Shekel, Sunnyvale, CA (US)

(73) Assignees: BlackBerry Limited, Waterloo (CA); ATHOC, Inc., San Mateo, CA (US)

( * ) Notice: Subject to any disclaimer, the term of this patent is extended or adjusted under 35 U.S.C. 154(b) by 295 days.

(21) Appl. No.: 16/116,445

(22) Filed: Aug. 29, 2018

(65) Prior Publication Data
US 2020/0074362 A1 Mar. 5, 2020

(51) Int. Cl.
| | |
|---|---|
| G06Q 10/06 | (2012.01) |
| H04L 29/06 | (2006.01) |
| G06F 17/30 | (2006.01) |
| G06F 16/9535 | (2019.01) |

(52) U.S. Cl.
CPC ... *G06Q 10/06311* (2013.01); *G06F 16/9535* (2019.01); *H04L 63/0428* (2013.01); *H04L 63/10* (2013.01)

(58) Field of Classification Search
CPC .. G06Q 10/06311; G06Q 10/00; G06Q 50/01; G06Q 10/06; G06F 16/9535; G06F 16/27; G06F 16/9536; G06F 16/1837; H04L 63/0428; H04L 63/10
See application file for complete search history.

(56) References Cited

U.S. PATENT DOCUMENTS 10,097,557 B2 * 10/2018 Armer ............... H04L 63/105
2004/0183829 A1 * 9/2004 Kontny .............. G06Q 10/10
715/758

(Continued)

OTHER PUBLICATIONS

Marco Neumann et al., Semantic social network portal for collaborative online communities, Journal of European Industrial Training (Year: 2005).*

(Continued)

*Primary Examiner* — Shanto Abedin
(74) *Attorney, Agent, or Firm* — Fish & Richardson P.C.

(57) ABSTRACT

Systems, methods, and software can be used to establish collaborative communications. In some aspects, a server receives a contact search request from an application of a first organization, the contact search request including contact information. The server determines a second organization, wherein the second organization is connected to the first organization to enable a user of the first organization to search a user directory of the second organization. The server determines a subset of the user directory of the second organization that can be searched by the user of the first organization. The server transmits, to the application of the second organization, the contact information and information of the determined subset of the user directory of the second organization. The server receives a contact search result from the application of the second organization. The serer transmits the received contact search result to the application of the first organization.

17 Claims, 11 Drawing Sheets

(56) References Cited

U.S. PATENT DOCUMENTS

| | | | |
|---|---|---|---|
| 2007/0033142 A1* | 2/2007 | Patten | G06Q 10/10 |
| | | | 705/51 |
| 2008/0040428 A1* | 2/2008 | Wei | G06Q 50/10 |
| | | | 709/204 |
| 2009/0100052 A1* | 4/2009 | Stern | G06F 16/9535 |
| 2009/0171979 A1* | 7/2009 | Lubarski | G06Q 10/10 |
| 2010/0063959 A1* | 3/2010 | Doshi | G06F 16/27 |
| | | | 707/618 |
| 2010/0262550 A1* | 10/2010 | Burritt | G06Q 30/02 |
| | | | 705/319 |
| 2011/0078129 A1* | 3/2011 | Chunilal | G06F 16/9535 |
| | | | 707/706 |
| 2012/0095931 A1* | 4/2012 | Gurion | G06Q 10/00 |
| | | | 705/319 |
| 2012/0191693 A1* | 7/2012 | Alexander | G06F 21/30 |
| | | | 707/709 |
| 2013/0318589 A1* | 11/2013 | Ford | H04L 63/0428 |
| | | | 726/7 |
| 2014/0298207 A1* | 10/2014 | Ittah | G06Q 10/00 |
| | | | 715/753 |
| 2015/0127628 A1* | 5/2015 | Rathod | G06F 16/955 |
| | | | 707/710 |
| 2015/0370905 A1* | 12/2015 | Leon | G06F 16/9535 |
| | | | 707/722 |
| 2016/0255139 A1* | 9/2016 | Rathod | H04L 51/046 |
| | | | 709/203 |
| 2018/0183797 A1* | 6/2018 | Gold | H04L 63/10 |
| 2018/0373796 A1* | 12/2018 | Rathod | G06F 16/9535 |

OTHER PUBLICATIONS

Extended European Search Report issued in European Application No. 19194154.1 dated Oct. 2, 2019, 9 pages.

* cited by examiner

FIG. 6

TRUSTED COLLABORATIVE COMMUNICATIONS BETWEEN ORGANIZATIONS

TECHNICAL FIELD

This disclosure relates to collaborative communications between organizations.

BACKGROUND

Collaboration and resource sharing between organizations in the private and government sectors is a growing need. Existing collaboration and resource sharing solutions are easier to setup and use internally—e.g. inside one organization, but extending the collaboration and resource sharing externally is challenging because it requires the organizations to trust each other. There is no standard, controlled and secured way today to establish trust between organizations that want to collaborate and/or share resources.

DESCRIPTION OF DRAWINGS

FIG. 6 illustrates a webpage for requesting a connection according to some implementations.

Like reference numbers and designations in the various drawings indicate like elements.

DETAILED DESCRIPTION

Figure 1:
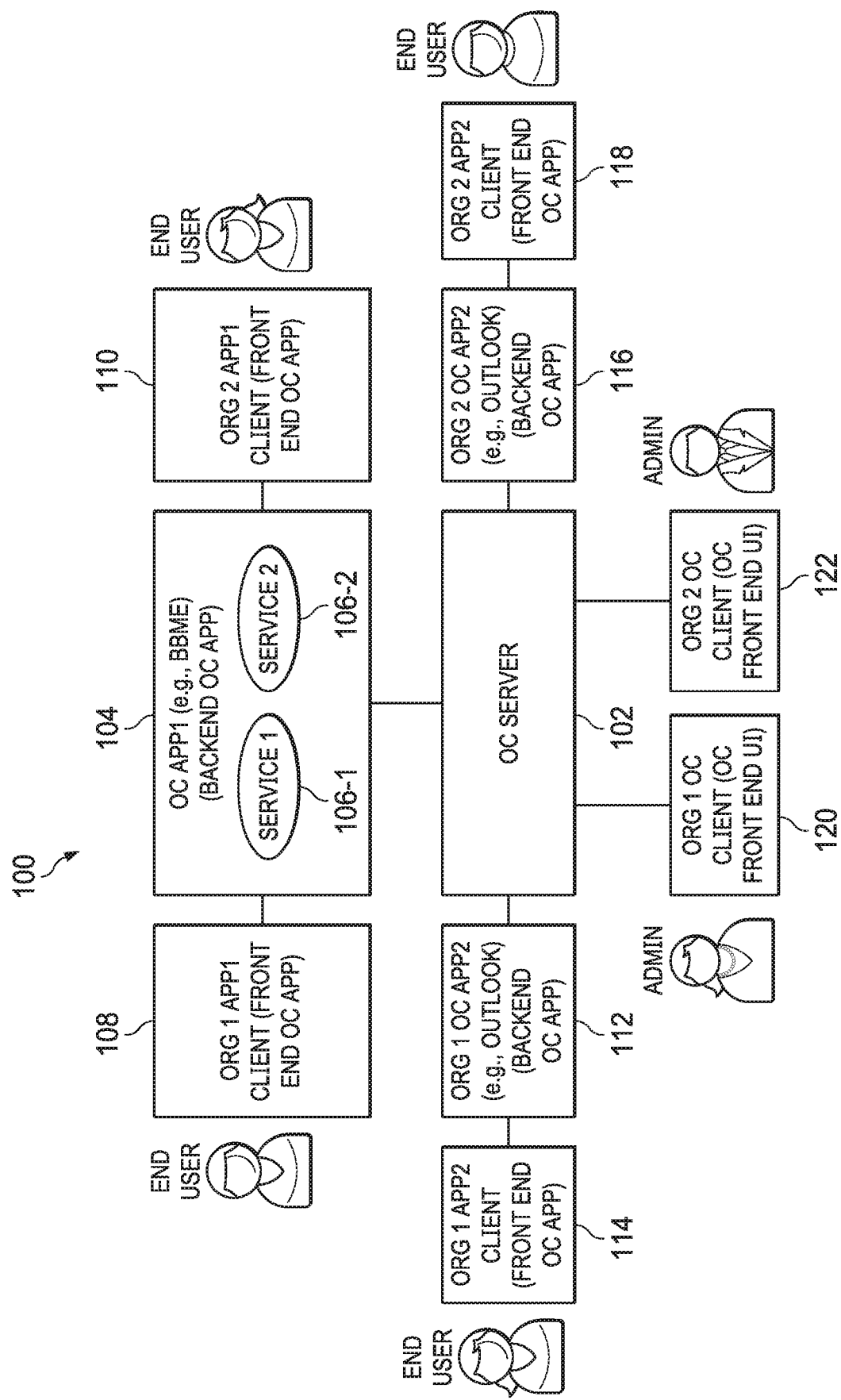
FIG. 1 is an example organization connect (OC) system according to some implementations.

The present disclosure is directed to trusted collaborative communications between organizations. This disclosure describe approaches that enable applications' vendors to define agreements templates that are specific to their applications and enable organizations that use such applications to easily agree on the scope of collaboration and device sharing between them.

In some cases, secured communications or resource sharing among organizations are desired. For example, an enterprise messaging application (e.g., SKYPE for business) usually allows a user to search the user directory of its own organization, but not the directory of another organization. In some cases, it is useful for a user of one organization to be able to search directories of other organizations and add someone from other organizations as a contact. As such, the user can communicate with not only the contacts within his or her own organization but also the contacts from other organizations. In some cases, collaborative communications also enable secured resource sharing or information sharing among organizations, such as sharing data from various devices (such as Internet of Thing (IoT) devices) of different organizations. For example, it is useful for a police department to access surveillance cameras of different organizations for crime investigation.

In some cases, an organization connect (OC) system can be used to enable the secured collaborative communications between organizations. An OC system includes a directory of organizations that registered to the OC system. The organizations registered to the OC system are called OC organizations. The OC system also stores trusted relationships among these OC organizations so that each OC organization can establish its own trusted network by creating OC connection(s) with organizations it trusts. For registering to the OC system, the organization can submit a registration request including information of the organization, and the OC system can verify the identity of the organization (e.g., the OC system verifies that an organization claimed to be the White House is indeed the White House). After the organization registers to the OC system, the organization can decide what other OC organizations it can trust for collaborative communications. For example, the directory of the verified organizations includes thousands of registered organizations. The White House may only trust certain government agencies and allow these government agencies to connect to the White House for collaborative communications. Such trusted relationship is also stored in the OC system (e.g., an OC server).

Applications that use APIs provided by the OC system or leverage the trusted relationship between the verified OC organizations are called OC applications (or OC trust-based applications), e.g., BLACKBERRY MESSENGER enterprise (BBME). OC applications are registered to the OC system. Users of OC applications can collaboratively communicate with others across their organization's trusted network. Each OC application can include one or more OC services. An OC service can use OC APIs provided by the OC system to leverage the trusted relationship between the verified OC organizations. For example, BBME application can include a first OC service of user lookup so that organization (Org) A's users can look up Org-B's users, e.g., by a person's name. BBME application can also include a second OC service of collaboration room so that both Org-A's and Org-B's users can join the same online meeting room provided by BBME.

An OC organization can establish connection(s) with another OC organization. Connections can provide collaborative communications or information sharing across trusted organizations. For example, a connection can provide controlled and secured sharing of contact directories between connected organizations. A connection can also provide controlled and secured sharing of devices (e.g., IoT devices such as security cameras and fire sensors/alarms) between connected organizations. For instance, the information technology (IT) admin of a requesting organization (Org-R) can send a connection request to the OC system to connect with a target organization (Org-T). In some cases, one connection uses one OC application (e.g., both Org-T and Org-R use the same application BBME). Multiple connections can be established between two organizations. For example, Org-R can establish a first connection with Org-T for BBME so that Org-R's users can search Org-T's contact directory (the search can be one direction or mutual) and add Org-T's users as contacts in BBME. Org-R can also establish a second connection with Org-T for OUTLOOK so that Org-R's users can search Org-T's email directory and automatically obtain an Org-T user's email address in OUTLOOK by searching that Org-T user's name (the search can be one direction or mutual). In some other cases, one connection can use multiple OC applications. For example, Org-R uses BBME while Org-T uses a different chat application, and a connection can still be established so that users of Org-R and Org-T can chat with each other. Further, as will be discussed later, in some cases a connection can be established between one Org-R and multiple Org-Ts so that information sharing is achieved among the Org-R and the multiple Org-Ts.

Each connection is associated with a connection agreement. The connection agreement defines the scope of the the collaboration between the connected organizations or capabilities of the connection. The agreement can specify the collaboration scope for each service provided by the OC application associated with the connection. The connection agreement can include a number of users, a type of users, a number of resources, or type of resources. For example, when the admin of an Org-R (Admin-R) sends a connection request to the OC system requesting to establish a connection to an Org-T for the BBME application, Admin-R and the admin of the Org-T (Admin-T) can negotiate to reach a connection agreement. For example, the agreement may specify that for the user lookup service Org-T can only search certain departments of Org-R (e.g., only the users in sales department are visible to Org-T). The agreement may also specify that for the collaboration room service a limited number of Org-T users can join the collaboration room (e.g., a maximum of 4 Org-T users can join the collaboration room). As will be discussed later, the agreement can be stored either at the OC system (e.g., an OC server) or the OC application (e.g., backend OC application). When a user of Org-R or Org-T requests a service of the OC application, the connection agreement is executed to determine if the user is allowed to perform the requested service. For example, when an Org-R user requests to join the collaboration room, it is determined whether the number of Org-R users in the collaboration room has reached the threshold specified in the agreement. As will be discussed later, the agreement can be enforced by either the OC system (e.g., an OC server) or the OC application (e.g., the backend OC application).

FIG. 1 is an example OC system 100 according to some implementations. In one implementation, a server receives a contact search request from an application of a first organization, the contact search request including contact information. The server determines a second organization, wherein the second organization is connected to the first organization to enable a user of the first organization to search a user directory of the second organization. The server determines a subset of the user directory of the second organization that can be searched by the user of the first organization. The server transmits, to the application of the second organization, the contact information and information of the determined subset of the user directory of the second organization. The server receives a contact search result from the application of the second organization. The server transmits the received contact search result to the application of the first organization.

The described OC system can provide a directory of verified organizations (i.e., OC organizations) and the trusted connections between them. Application developers can leverage the OC system via application programming interfaces (APIs) to develop OC trust-based applications. An OC organization's IT admin can establish a trusted network by requesting a connection with, or accepting connections requests from, OC organizations it trusts. An OC organization's end users can use OC trust-based applications to securely communicate and collaborate across their organization's trusted network in a controlled way so that the organization authorized personnel (e.g., IT admins) can set the scope of the collaboration between the organizations. For example, the organization authorized personnel can select what other organizations can view their organizations. In one example, for an external lookup operation, authorized personnel can select to hide some of their users such that other organizations' users will not be able to find them. In another example, for a business-to-business (B2B) device sharing or resource sharing operation, authorized personnel can select what devices/resources are available for collaboration with each of their trusted partners. The OC system provides a platform to connect multiple organizations and enable secured communications across these organizations. For example, a user of one organization can search contacts from external connected organizations, and this cannot be achieved by current systems. Through the OC system, data collected by devices (such as IoT devices) of different organizations can be shared so that fewer devices can be deployed.

The example OC system 100 includes an OC server 102, OC clients 120 and 122, backend OC applications 104, 112, and 116, and corresponding front end OC applications 108, 110, 114, and 118. The OC server connects with the OC clients and the backend OC applications. The OC client can be a client software, hardware, or a combination of software and hardware accessible by an organization admin (or deployed at a computing device of the admin). For example, the OC client can be a front-end user interface (e.g., a web-based user interface) for the organization admin to interact with the OC server 102. Each organization has its own OC client. For example, Org-1 has the OC client 120 and Org-2 has the OC client 122. Org-1's admin can use the OC client 120 to submit a registration request to register Org-1 to the OC server 102. A directory of registered OC organizations can be stored at the OC server 102. After registration, Org-1's admin can further use the OC client 120 to build up its trusted network. For example, the QC client 120 can display the directory of registered OC organizations that are set to be visible to Org-1. Org-1 admin can select the organizations that Org-1 trusts for collaborative communications and send the corresponding connection request to the OC server 102. Such trusted relationship can be stored at the OC server 102. Org-1 can also use the OC client 120 to negotiate agreements associated with connections.

An OC application can include a backend server component connected with a front-end client component. The backend OC application can be deployed at a server or in a cloud-computing environment. The front-end OC application is deployed at the computing device of an end user (e.g., a mobile phone, a desktop, or a laptop). The front-end OC application can provide a user interface for the end user to use the OC application. The backend OC application can include one or more OC services, e.g., OC services 106-1 and 106-2 as shown in FIG. 1. An OC service can use OC APIs to access OC backend services. The OC application can use OC APIs either directly or via OC services.

In some cases, the same backend OC application can support multiple organizations, but different organizations have its own front-end OC application. For example, Org-1 and Org-2 both use the backend OC application 104 (e.g., BBME application) to provide collaborative messenger services. The backend BBME application 104 is connected to both Org-1's front-end BBME application 108 and Org-2's front-end BBME application 110. In some other cases, for the same OC application, different organizations have its own backend OC application. For example, for the OUTLOOK application, Org-1 has its own backend OUTLOOK application 112 connected with Org-1's front-end OUTLOOK application 114, and Org-2 has its own backend OUTLOOK application 116 connected with Org-2's front-end OUTLOOK application 118. In FIG. 1, two connections can be established between Org-1 and Org-2, a first connection associated with BBME for collaborative messenger services, and a second connection associated with OUTLOOK for collaborative email services.

As discussed earlier, in some other cases, a connection can use different applications. For example, Org-1 uses OUTLOOK and Org-2 uses another email application (e.g., EmailX) to provide collaborative communications. In this case, Org-1 has its own backend OUTLOOK application and Org-2 has its own backend EmailX application, where the OC server enables collaboration between Org-1's users and Org-2's users as Org-1's backend OUTLOOK application and Org-2's backend EmailX application are using OrgConnect APIs(in other words, the entity 116 can be a backend EmailX application instead of a backend OUTLOOK application).

Figure 2:
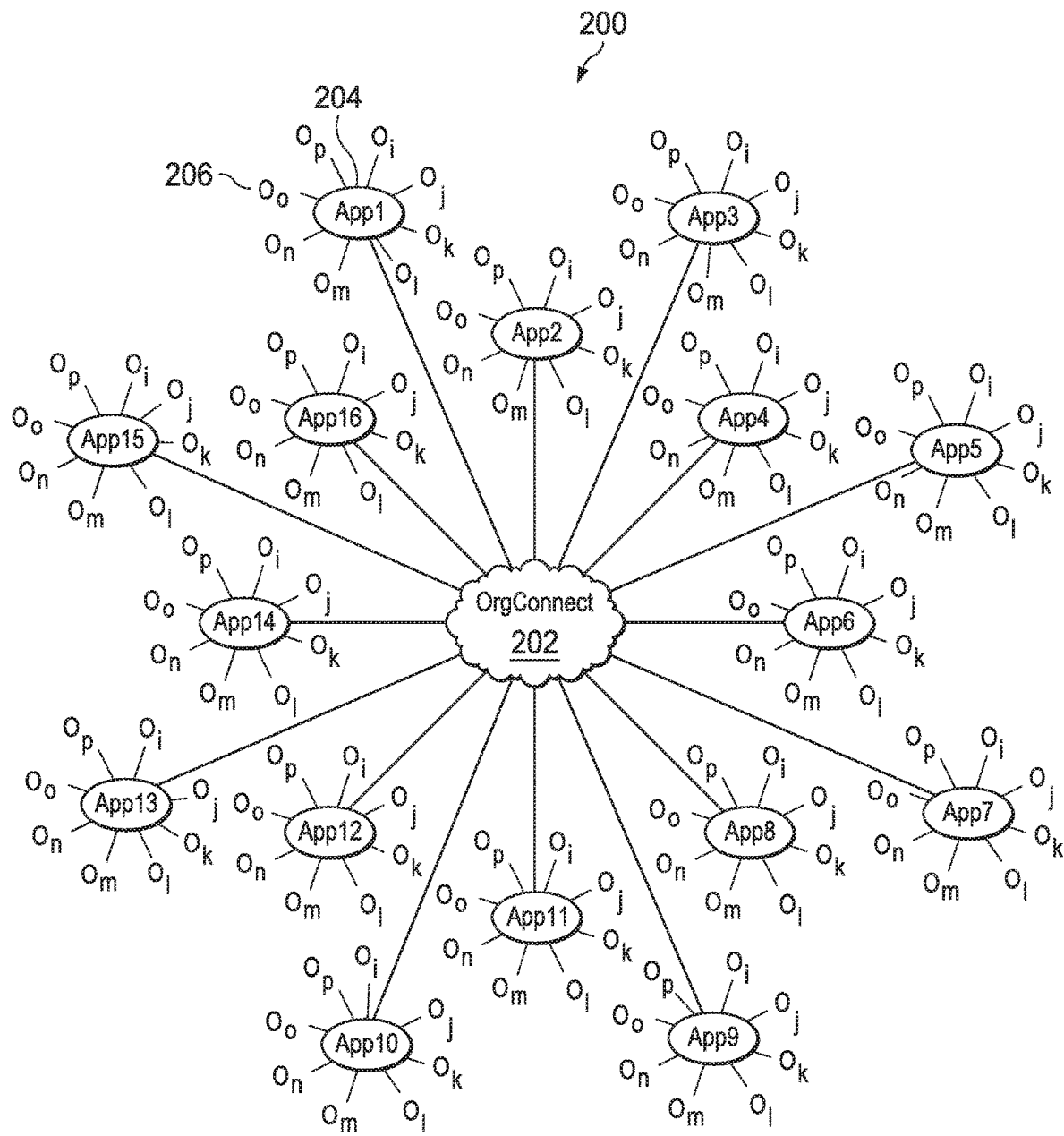
FIG. 2 illustrates a second example OC system according to some implementations.

FIG. 2 illustrates a second example OC system 200 according to some implementations. As discussed above, the OC system 200 includes an OC server 202 connected with various OC applications 204 that support collaborations across multiple trusted organizations such as organization $O_o$ 206.

An OC connection can include connection information that defines the collaboration between two or more connected organizations. The connection information associated with a connection can include:

(1) Organization connectivity: a list of the connected organizations associated with the connection, e.g., two organizations in case of one-to-one collaboration (one Org-R and one Org-T), or multiple organizations in the case of one-to-many collaboration (Org-R and multiple Org-Ts).

(2) Connection agreement: defines the actual collaboration. As discussed below, the connection agreement is based on a collaboration template (or agreement template). This template is a common denominator of the capabilities of the applications that are involved with this connection.

(3) Connection history: can include, but not limited to, connection request/acceptance/cancellation by whom and when, reasons provided by admins of Org-Rs and Org-Ts, updating agreements (including negotiated agreements versions).

Connection requests can be initiated by an Org-R targeting one or more Org-T(s), and is based on a collaboration template. The collaboration template defines collaboration capabilities of OC application(s) that are available for collaboration between two or more OC organizations. A collaboration template is divided into sections, and each section corresponds to one OC service. In some cases, if the connection is between organizations that use the same OC application, the developer of that application can set the template and register the template as part of the OC application registration with the OC server. If the connection is between organizations that use multiple OC applications, the respective applications' developers can agree on a collaboration template. The collaboration template can be stored at the OC server. The collaboration template can also be signed by the associated OC application(s) (e.g., using encryption key(s) of the OC application(s)).

Figure 3:
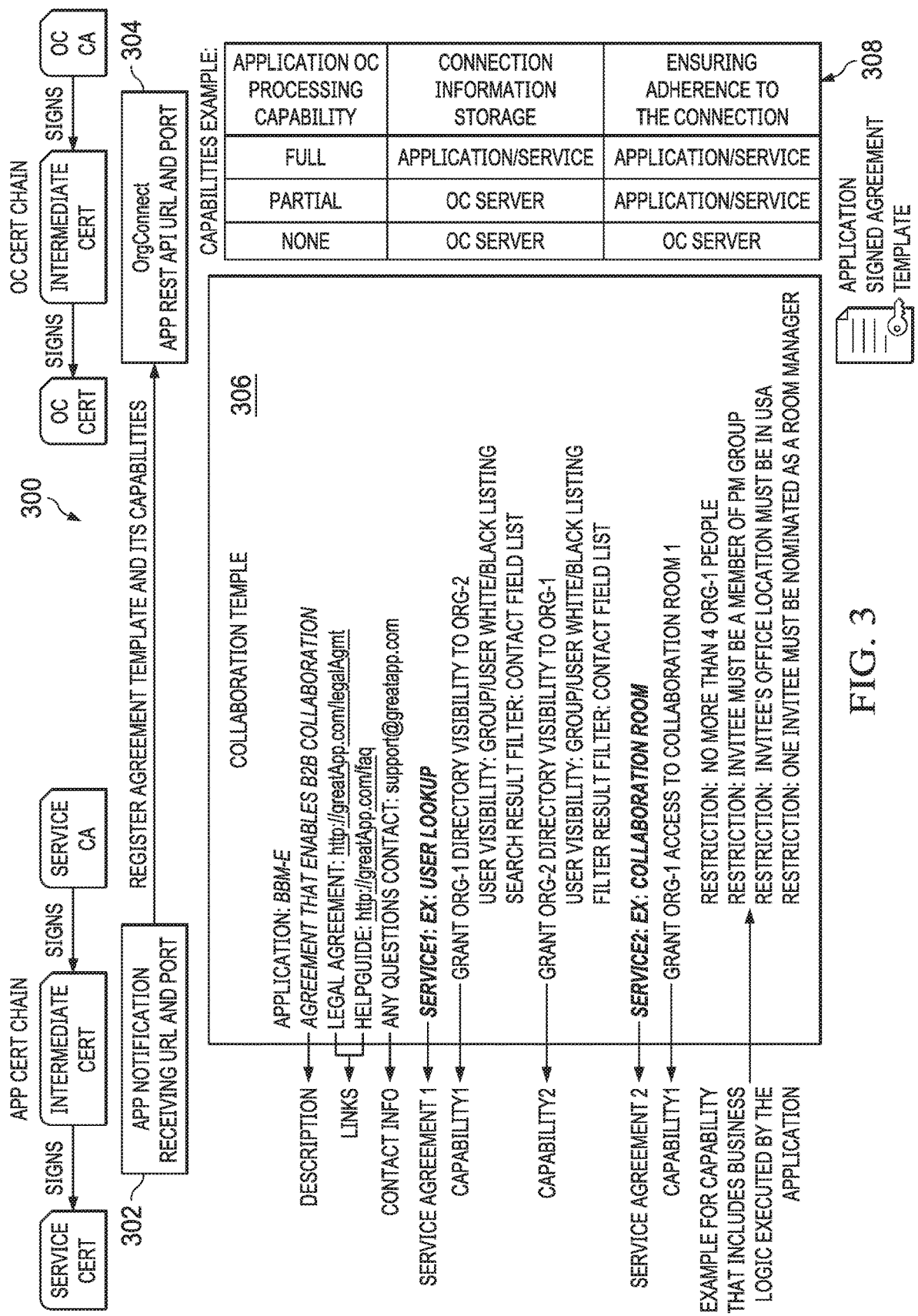
FIG. 3 illustrates an example collaboration template according to some implementations.

FIG. 3 illustrates an example collaboration template according to some implementations. The collaboration template 306 provides a template for specifying collaboration capabilities of a BBME application. The developer of BBME app 302 can register the collaboration template 306 with the OC server 304. The collaboration template 306 includes a first section for a user lookup service and a second section for a collaboration room service.

The section for the user lookup service can specify the lookup capabilities when Org-1 and Org-2 are connected to use BBME for contact lookup across two organizations. For example, this section can specify:

(1) Mutual lookup or one direction lookup: For example, in some cases, Org-1 can see Org-2's user directory and Org-2 can also see Org-1's user directory. In some cases, Org-1 allows Org-2 to see Org-1's user directory, but Org-2 does not allow Org-1 to see Org-2's directory.

(2) Whitelist/blacklist users (or groups) that are visible or not visible to other organizations: For example, in some cases, Org-1 allows Org-2 to search only a part of Org-1's user directory (e.g., Org-2 can only see Org-1's users in the sales department). In some cases, Org-1 does not allow Org-2 to search a certain part of Org-1's user directory (e.g., Org-2 cannot see Org-1's users above a VP level).

(3) Filters of contact fields, i.e., specify what user's information is visible to other organizations. For example, Org-1 allows Org-2 to search Org-1 users for both cell phone and email information, but Org-1 may only allow Org 3 to search Org-1 users for email information and hide the cell phone information.

The section for the collaboration room service can specify rules for allowing users of other organizations to access the collaboration room. For example, an organization allows up to 4 participants from the connected organization(s) to join the collaboration room, one of the participants must have the title of a Product Manager, and the participants must belong to a certain group (and if they are no longer in the group, they can no longer access the collaboration room).

If an OC application provides image/video sharing among security cameras (or data sharing among IoT devices), the collaboration template of this OC application can include a section specifying capability information such as:

(1) Whitelist/blacklist cameras that are visible or not visible to other orgs (2) Mutual sharing vs. one direction sharing (e.g., in some cases, Org-1 can see Org-2's cameras and Org-2 can also search Org-1's cameras. In some cases, Org-1 can see Org-2's cameras, but Org-2 cannot see Org-1's cameras.)

(3) Feed sharing or image recognition based sharing (e.g., based on car or face images)

Collaboration Template can consist of items that all the connected organizations need to agree, and items that every organization can change without needing approval of the other connected organizations. For example, for the user lookup service where any organization can change the visibility of some of its users to any other connected organization without needed approval (or without even needing to inform the other organizations).

The OC system may connect thousands of organizations, and there can be millions of real time computations involved. Depending on the processing capabilities of applications, the computation load can be shared between the OC server and the applications. For distributing the computation load, the application 302 can send its processing capabilities to the OC server 304 during the application registration. Table 308 indicates three possible application processing capabilities: full capability, partial capability, or no capability.

In case of the application having full OC processing capability, the application stores the connection information that includes the organization connectivity and the connection agreement. When an end user sends a request to use the application for collaborative communication, the application decides if the request can be processed or not based on the stored organization connectivity and connection agreement. For example, Org-1 and Org-2 are connected to enable BBME users to conduct external contact lookup. When a BBME user of Org-1 types a person name and requests an external search in Org-2, the BBME backend application verifies that Org-1 and Org-2 are connected based on the stored organization connectivity and executes the connection agreement (e.g., determining the searchable subset of the user directory based on the whitelist in the connection agreement). In other words, the application uses the stored organization connectivity and connection agreement to enable the external cooperation adhering to the connection properties.

In case of the application having partial OC processing capability, the OC server stores the connection information and the application executes the connection agreement. For example, the application can query the OC Server to verify if Org-1 and Org-2 are connected. If connected, the application retrieves the connection agreement from the OC server, and the application enables the external cooperation adhering to the retrieved connection agreement.

In case of the application having no OC processing capability, the OC server stores the connection information and executes the connection agreement. The application provides the OC server with information that may include the application user identity, what organization the requesting user belongs to (e.g., Org-1), what is the target organization (Org-2), and the target user. The OC server verifies that Org-1 and Org-2 are connected and such connection is using the connection agreement that is based on the applications collaboration template. After the successful verification, the OC server uses the connection information to enable the external cooperation adhering to the connection agreement.

Figure 4:
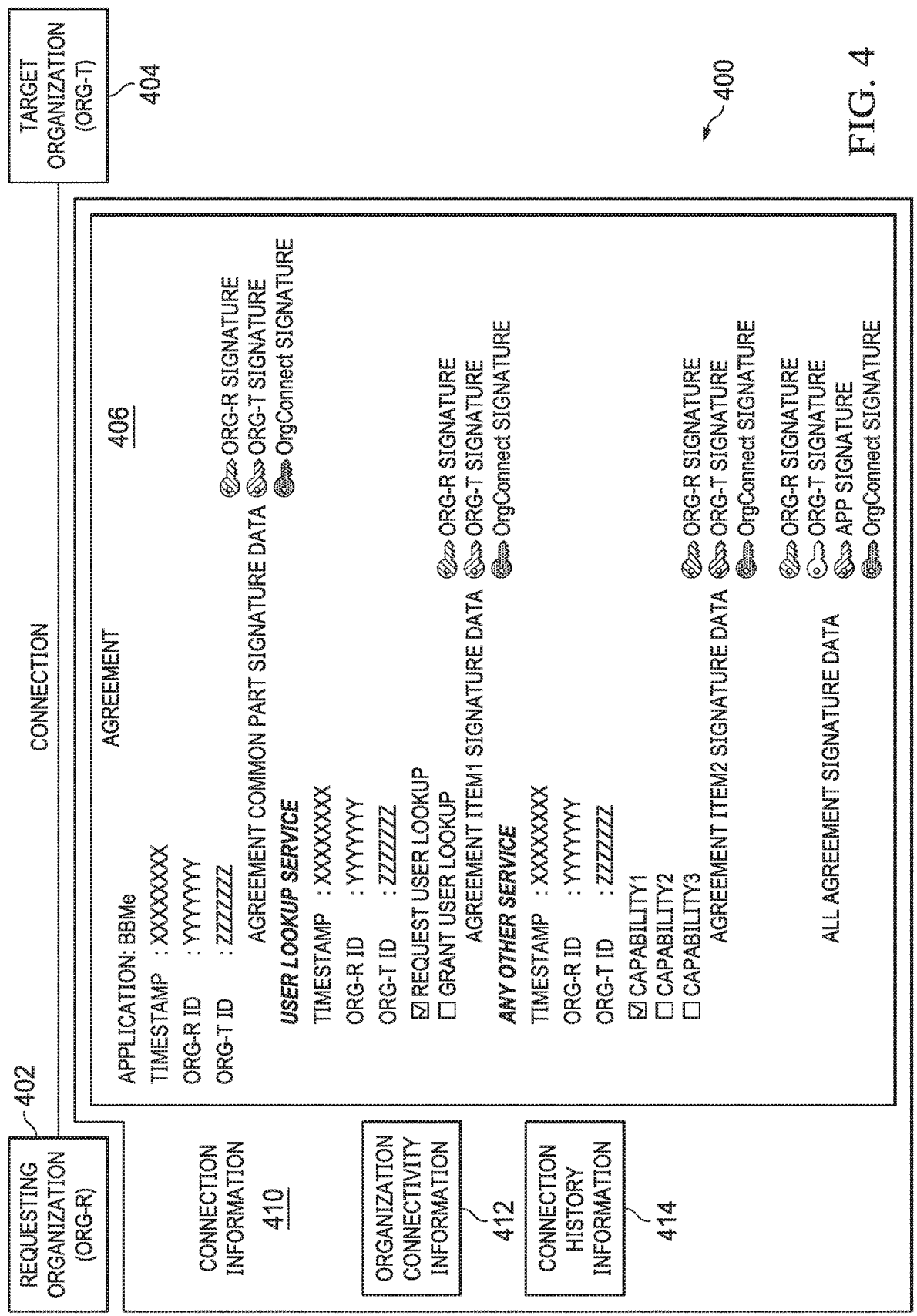
FIG. 4 illustrates a connection agreement between a requesting organization (Org-R) and an target organization (Org-T) according to some implementations.

FIG. 4 illustrates example connection information 410 transmitted between an Org-R 402 and an Org-T 404 according to some implementations. The connection information 410 includes the connection agreement 406. The connection agreement 406 specifies the actual collaboration based on a collaboration template. For example, the collaboration template can include various collaboration options for each service, and the connection agreement specifies the selected options for this connection. The connection agreement 406 can include a common section for all services and separate sections for each service. Each section is signed separately by Org-R, Org-T and the OC system (or the OC server). The connection information 410 also includes organization connectivity information 412 and connection history information 414, as discussed previously.

Figure 10:
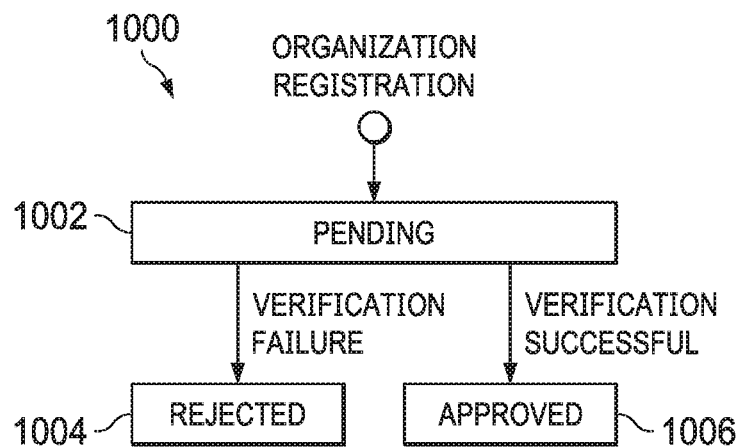
FIG. 10 shows a state diagram illustrating an organization status in an OC server according to some implementations.

FIG. 10 shows a state diagram 1000 illustrating an organization status in an OC server according to some implementations. An organization can send a registration request to the OC server using an OC client. The registration request can include organization registration information. For example, the organization registration information can include one or more of: organization name, address, website, industry sector, data universal numbering system (DUNS) number (if available), visibility setting (e.g., specify the organizations it trusts for establishing connections), contact information, and organization owner.

At 1002, after receiving the registration request, the OC server stores the organization information and marks the organization with a state of "pending". The OC server then verifies the organization registration information. The verification can be done automatically using API of available systems/databases like DUNS or other accessible databases and/or manual verification whereby OC operation personnel verifies organization information manually, for example, by contacting the organization, checking the background of the organization and the organization contact. At 1006, if the organization is successfully verified, the OC server updates the organization status to "approved". At 1004, if the organization is not successfully verified, the OC server updates the status as "rejected" and informs the reason of the rejection to the organization.

After the organization is registered to the OC server, the OC server allows the organization to use the OC capabilities securely via the OC client including but not limited to: connections management (e.g. request connections, cancel connection requests, or accept connections from other organizations, and delete connections to other OC organizations), admin roles assignments, organization profile edits, access to audit logs, and access to OC inbox/outbox.

The OC server can establish an organization specific key pair. For example, an organization may bring its own key and the associated public certificate and provide the certificate to the OC server (or OC system). Alternately, the OC client can generate the key pair, get the certificate prepared with a well-known certificate authority (CA) and provide the public certificate to OC server. Another possibility is that the OC server can generate the key pair and provide the private key to the organization.

Note that FIG. 10 can include additional statues. For example, an approved organization can ask to be removed (a status of "removed by organization request"), or can be removed due to abuse (a status of "removed due to abuse").

Figure 11:
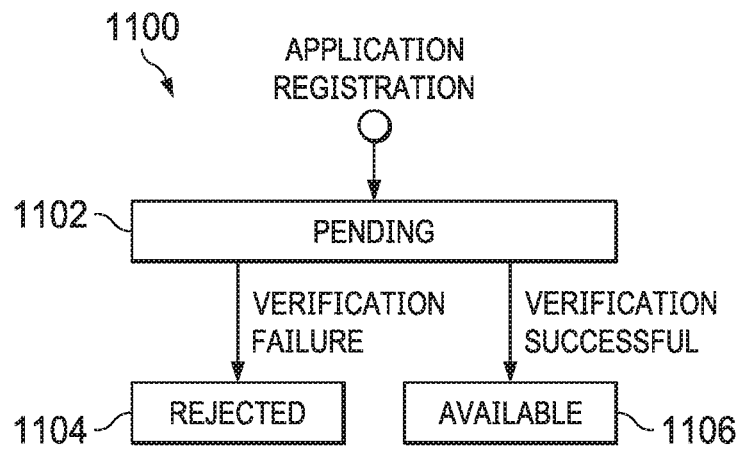
FIG. 11 shows a state diagram illustrating an application status in an OC server according to some implementations.

FIG. 11 shows a state diagram 1100 illustrating an application status in an OC server according to some implementations. An OC client can be deployed at the device of an OC application/service developer. The developer can use the user interface of the OC client to send a registration request to the OC server and register the application/service with the OC server. For example, the registration request can include application information including one or more of: developer organization name, contact information, DUNS information if available, application name, application description, signed collaboration template (e.g., signed by the application), API information for receiving OC notifications from the OC server, application certificate, and application processing capability.

At 1102, after receiving the registration request, the OC server stores the information in the request and marks this application with a status of "pending". Similar to the organization registration, the OC server verifies the developer's information programmatically where possible (e.g. based on DUNS information) and/or manually by OC operation personnel. At 1106, if the application is successfully verified, the OC server updates the application status to "available" (i.e., available for OC organizations to use). At 1104, if the application is not successfully verified, the OC server updates the status as "rejected" and informs the reason of the rejection to the developer. In some cases, the OC server can send information to the application/service developer via the OC client. The OC server can send information including but not limited to: application identifier, API endpoint information for testing and production, and OC application approval status.

After the application successfully registers to the OC server, the OC server adds this application to a list of applications that are available to OC organizations. When a connection is established between some OC organizations, such application can be selected for the purpose of communication, collaboration, workflow and/or device sharing between the connected organizations.

In some cases, the OC server provides notifications to the application using the API provided by the developer (e.g., the API information provided in the application registration request) whenever a new connection is made using this application. Depending on the application processing capabilities, the notification may include the connection information as described earlier. Note that FIG. 11 can include additional status such as suspended, removed due to developer request, or removed due to abuse.

Figure 5:
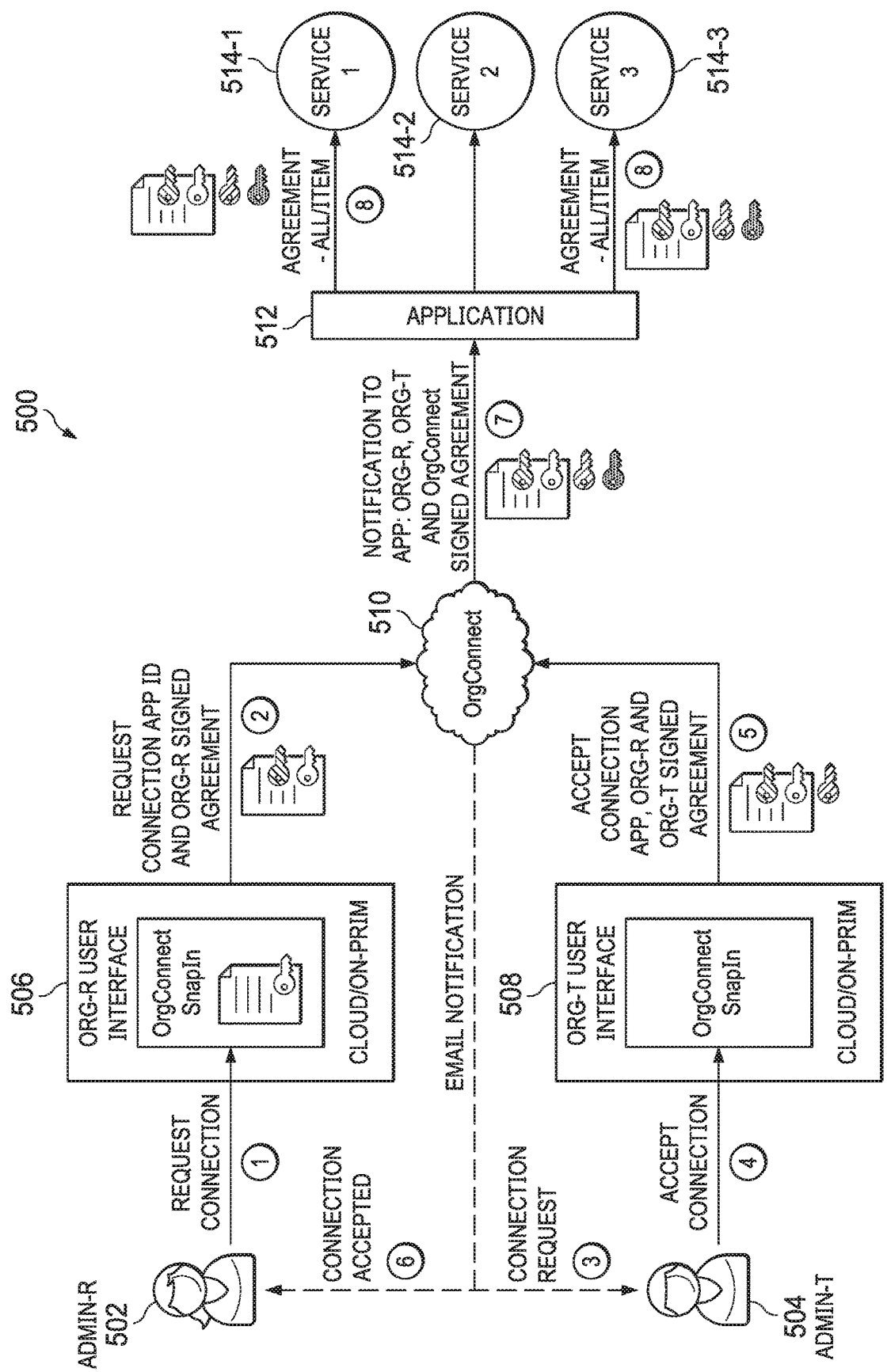
FIG. 5 is a flowchart illustrating a connection setup between two organizations according to some implementations.

FIG. 5 is a flowchart 500 illustrating a connection setup between two organizations according to some implementations. At step 1, the Admin-R 502 uses the OC client of Org-R (OC client-R) 506 to initiate a connection setup. The OC client-R 506 sends the initiation request to the OC server 510. The OC server 510 sends to the OC client-R 506 a list of OC organizations that are visible to Org-R (each organization can hide itself from selected organizations). The OC server 510 can also send a list of OC applications to the OC client-R 506. The OC client-R 506 can display the list of visible OC organizations and the application list so that the Admin-R 502 can select target organization(s) (Org-T(s)) for a connection and the application associated with the connection. After the Admin-R 502 selects the application, the OC server 510 sends to the OC client-R 506 the collaboration template associated with the selected application. Using the OC client-R 506, the Admin-R 502 establishes the initial connection agreement based on the collaboration template (e.g., filling the collaboration template or checking one or more boxes in the collaboration template).

Figure 6:
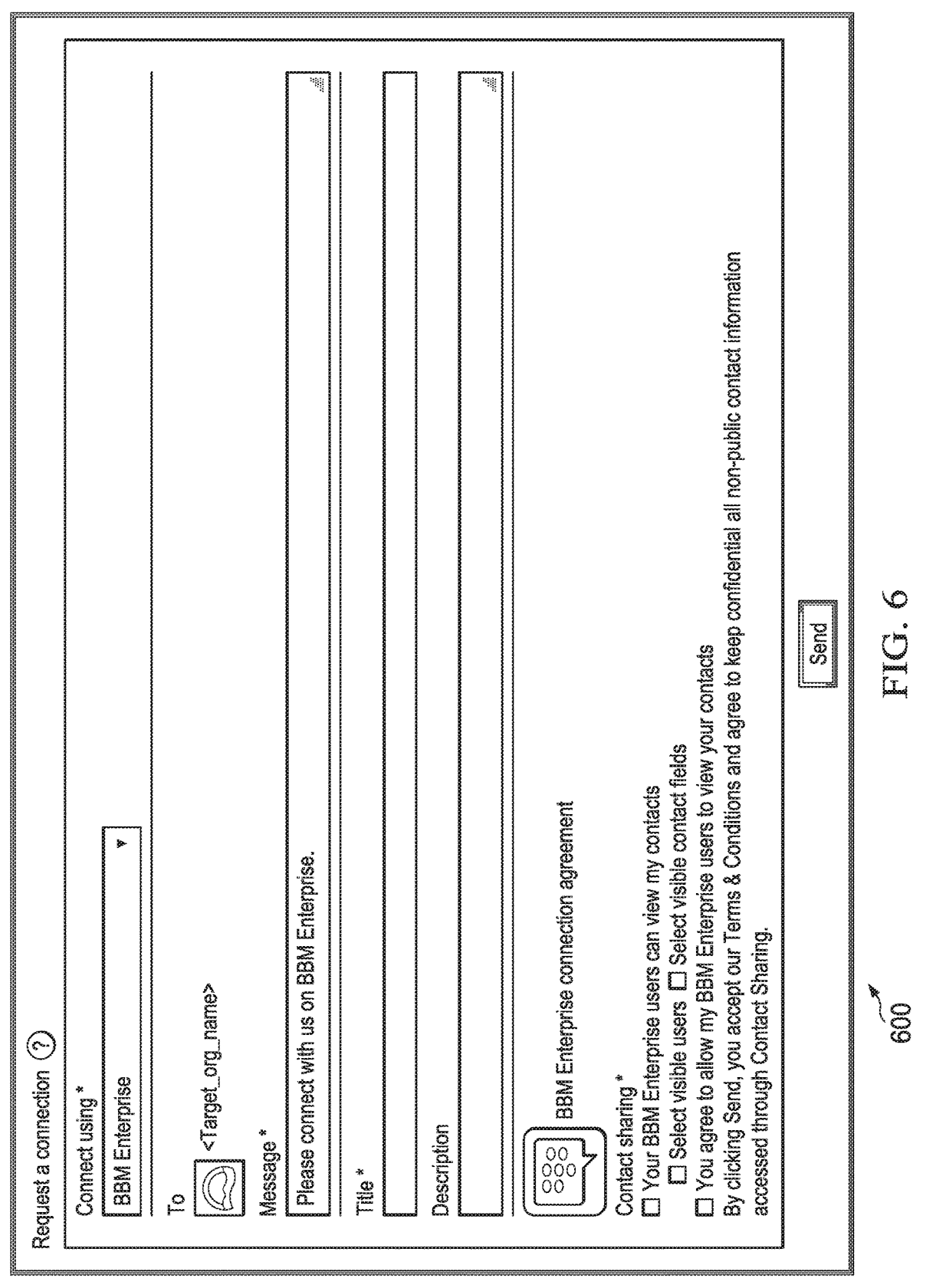

For example, FIG. 6 illustrates a webpage 600 for requesting a connection according to some implementations. The OC client-R can display the webpage 600 for the Admin-R to fill in. The Admin-R can specify the Org-T(s) for the connection and the OC application associated with the connection (e.g., BBME).

Figure 12:
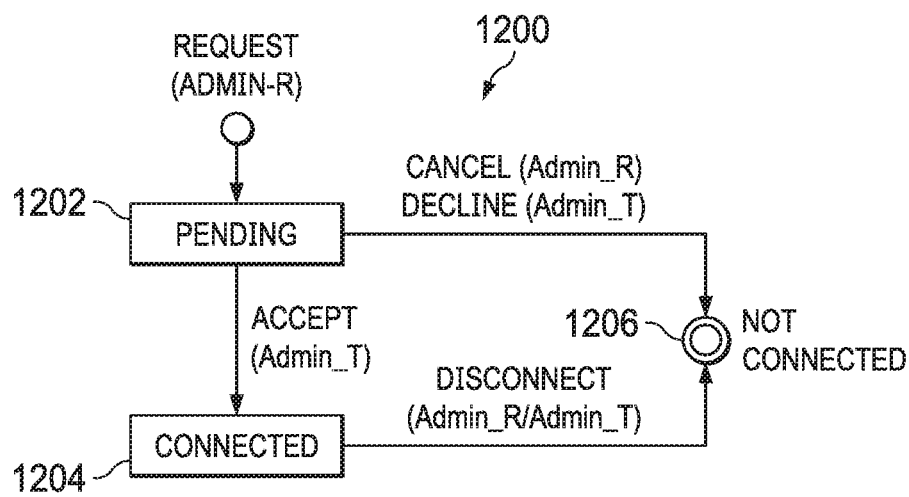
FIG. 12 shows a state diagram illustrating a connection status in an OC server according to some implementations.

At step 2, the OC client-R 506 sends the connection request to the OC server 510. The connection request includes the list of Org-T(s) and Org-R and the connection agreement. The connection request can be signed by the Org-R's private key. The collaboration template is signed by the application. After receiving the connection request, the OC server 510 stores a new connection at the OC server 510 and marks the connection with a status of "pending" (as shown in FIG. 12).

At step 3, based on the connection request, the OC server 510 sends a connection request notification to the Admin-T 504. The notification can be delivered in any usual approaches (e.g. email, OC inbox, phone, SMS, or alert notification). The notification can include information of the connection request. The Admin-T 504 can verify the connection request using the Org-R signature. The collaboration template (or the initial connection agreement from the Org-R) can be verified by the application signature (in case of multiple applications using each application's signature).

At step 4, Admin(s) of Org-T(s) (Admin-T(s)) 504 can accept or reject the connection request using the OC client-T(s) 508.

At step 5, the OC server 510 receives the acceptance(s) and/or rejection(s) from the Org-T(s). If at least one of the Org-T(s) accepts the connection request, the connection is established. For example, an Org-T can accept the connection request if it accepts the connection agreement from the Org-R. The Org-T(s) can also negotiate the connection agreement with the Org-R. The OC server 510 can update the connection information (e.g., organization connectivity and connection agreement) associated with the connection. Any Admin-T that declines/rejects the connection their organizations are removed from the organization connectivity. The OC server 510 adds information of the organizations that accept the connection request to the connection information (the organization connectivity) associated with the connection. When an Org-T accepts the connection, the connection information is signed by the Org-T's private key. The OC client-T 508 can send to the OC server 510 the connection agreement signed by the application, Org-T, and Org-R. The OC server 510 can store the connection information (the organization connectivity and the connection agreement). The OC server 510 also marks the connection state as "connected" (as shown in FIG. 12). If no Admin-T accepts the connection request, then there is no connection established.

At step 6, the OC server 510 informs the Admin-R 502, via the OC client-R 506 or other regular communications means (such as chat or email), of the acceptances and rejections from the Org-T(s).

At step 7, the OC server 510 sends the connection information to the backend OC application(s) 512. The OC server 510 signs the connection information with the OC server's private key. In other words, the connection information sent in step 7 includes the Org-R signature, the Org-T signature, and the OC server signature. The connection agreement in step 7 further includes the collaboration template with application signature(s).

At step 8, the backend application 512 sends the connection agreement to backend OC service(s) 514. As discussed earlier, the connection agreement include separate sections for different OC services, and the application 512 sends corresponding sections of the connection agreement to each OC service. For example, if the connection uses a user lookup service, the application 512 sends the agreement section of the user lookup (e.g., the section of the user lookup service in 406) to the user lookup service. The OC services 514 can verify the Org-R, Org-T and OC server signatures on the connection information. As discussed earlier, depending on the processing capability of the OC application (e.g., full, partial, or no capability in FIG. 3), the OC application 512 may store the connection information, or may retrieve the connection information from the OC server 510 (e.g. by querying the OC server 510) during the cross-organization collaboration.

In some cases, when Org-R sends connection request(s) to Org-T(s), the proposed connection is created in the OC server. When the Org-T(s) accepts the connection request, a connection is established between the Org-R and the Org-T(s). When more Org-Ts accept the connection request, those organizations are added to the connection information (e.g. add them to the organization connectivity). If any organization proposes a change to the connection request (e.g., a change to the connection agreement), a separate connection is created. When any Org-T cancels a connection, that Org-T is removed from the connection information (e.g. removed from the organization connectivity).

Figure 7:
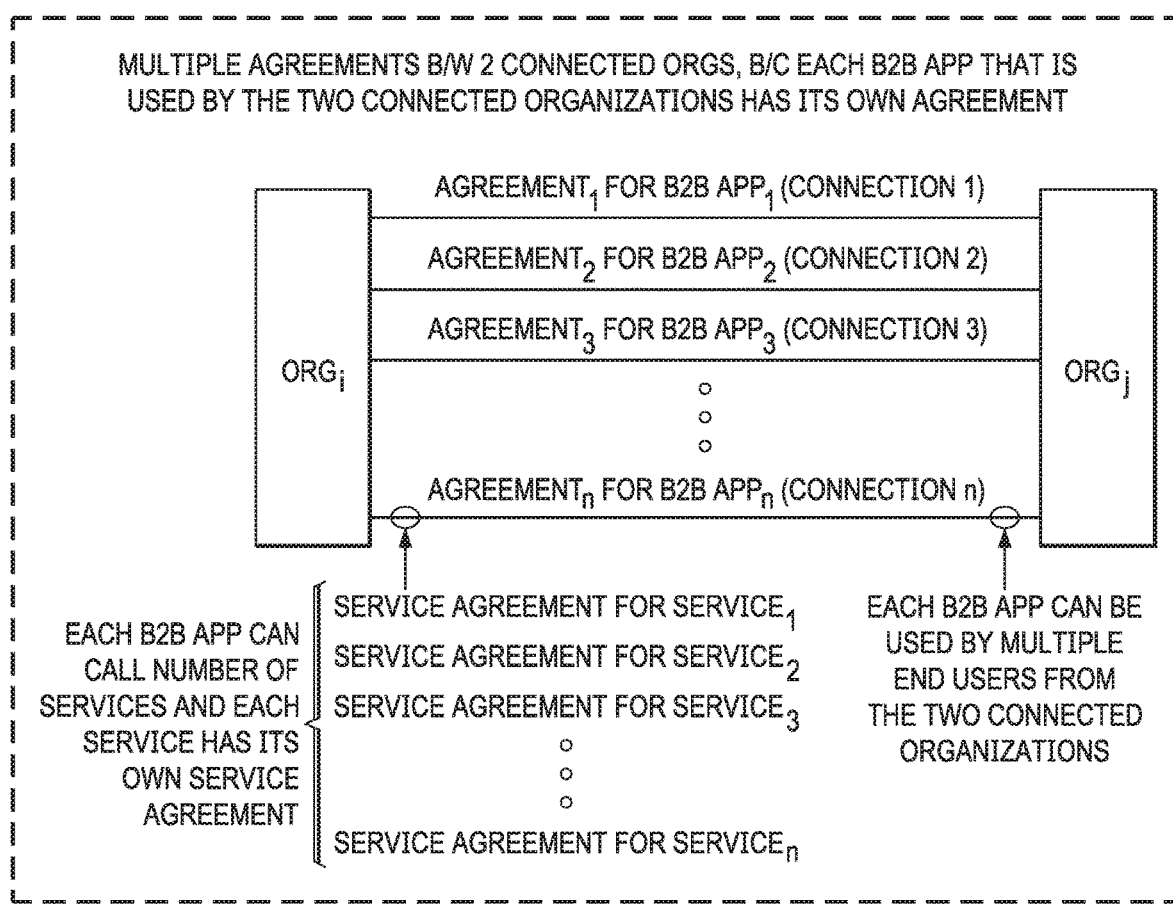
FIG. 7 illustrates multiple connection agreements between two connected organizations according to some implementations.

FIG. 7 illustrates multiple connection agreements between two connected organizations according to some implementations. FIG. 7 shows that each connection is associated with an application and has its own connection agreement. For each connection, the associated application can provide multiple services, and each service has its own agreement section within the connection agreement. A connection can also be associated with more than one application, for example when $Org_i$ uses $App_i$ and $Org_j$ uses $App_j$ in such case the connection agreement will be based on Agreement template that was agreed upon between the vendors of $App_i$ and $Appy_j$ FIG. 12 shows a state diagram 1200 illustrating a connection status in an OC server according to some implementations. As discussed earlier, the connection has a status of "pending" 1202 before any Org-T accepts the connection request, and the connection has a status of "connected" 1204 after at least one Org-T accepts the connection request. The status transitions from "connected" 1204 to "not connected" 1206 after a disconnect message is received by the OC server. The status transitions from "pending" 1202 to "not connected" 1206 after a cancel or decline message is received by the OC server.

Figure 8:
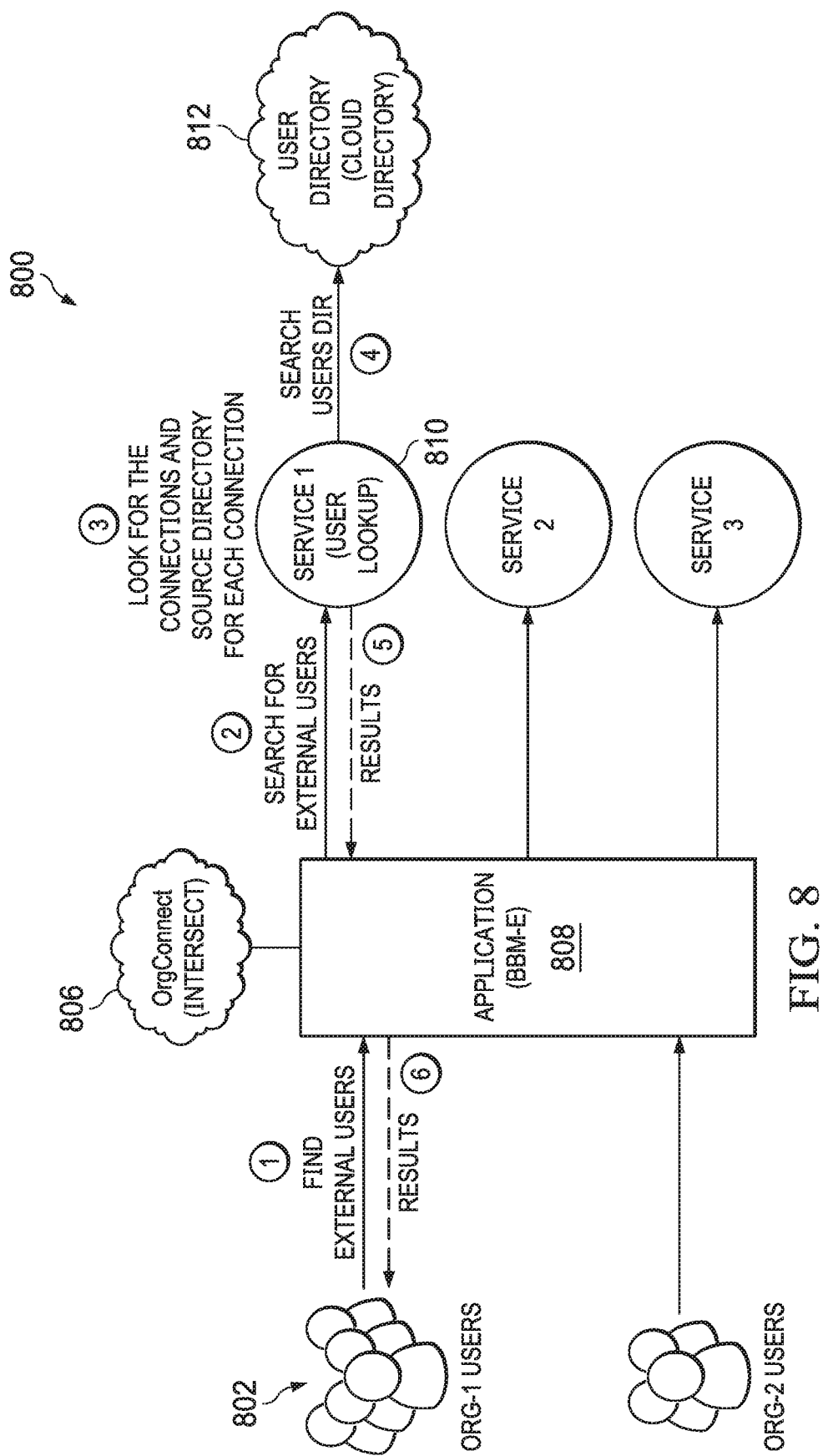
FIG. 8 is a flowchart illustrating an external user lookup service according to some implementations.

FIG. 8 is a flowchart 800 illustrating an external user lookup service according to some implementations. For example, Org-1 uses the OC system to connect with Org-2 and Org-3 and allow Org-1 users to search users across three organizations in a chat application (e.g., BBME). When an Org-1 user selects a person through a user interface of the chat application, e.g., by typing a person's name, selecting an icon representing a person, or using other user interface mechanism, for contact searching, the chat application can display contact(s) in Org-1 having that name as well as an icon indicating that the external contact search is available. When the Org-1 user clicks the icon, the chat application can display the contact(s) in Org-2 and Org-3 having that name. In FIG. 8, the OC application 808 supports both Org-1 and Org-2. In other words, the OC application 808 can be the OC application 104 of FIG. 1.

At step 1, Org-1 user 802 uses a front-end OC application (e.g., BBME) to request an external contact search (e.g., by clicking the icon indicating that an external contact search is available). The front-end OC application sends the external search request to back-end OC application 808, where the application 808 may support multiple services (e.g., a user lookup service 810 and some other services such as a collaboration room service). The contact search request can include the contact name for searching. Alternatively, the contact search request can also be a blanket request for a list of contacts that the Org-1 user 802 has access to according to the agreement.

If the backend OC application 808 has full OC processing capability (i.e., the backend application 808 stores the connection information and can execute the connection agreement), based on the stored connection information, the backend application 808 can determine the organization(s) that are connected to Org-1 for external user lookup (e.g., Org-2). The backend OC application 808 can also execute the agreement section corresponding to the user lookup service. For example, the backend application 808 can determine the subset of Org-2 user directory that is visible to Org-1 (e.g., Org-1 can only search a subset of the Org-2 user directory and also only show the contact fields allowed as per the agreement).

If the backend OC application 808 has partial OC processing capability (i.e., the OC server 806 stores the connection information and the backend application 808 executes the connection agreement), the backend application 808 can query the OC server 806 for the organization(s) that are connected to Org-1 for external user lookup (e.g., Org-2). The backend application 808 then retrieves the connection agreement from the OC server 806 and determine the subset of Org-2 user directory that is visible to Org-1.

If the backend OC application 808 has no OC processing capability (i.e., the OC server 806 stores the connection information and executes the connection agreement), the backend application 808 can send the user lookup request (e.g., including the application user identity of the requesting user 802 and the organization that the requesting user 802 belongs to) to the OC server 806. The OC server 806 can determine the organization(s) that are connected to Org-1 for external user lookup (e.g., Org-2) and the subset of Org-2 user directory that is visible to Org-1. The OC server 806 can send the determined subset of Org-2 user directory to the backend application 808.

At step 2, the backend OC application 808 sends the search request to the lookup service 810. The search request can include information of the connected organizations, results of the agreement execution (e.g., the subset of Org-2 user directory for search), and the contact name for searching.

At step 3, based on the search request of step 2, the lookup service 810 performs the user lookup in the connected organizations. For example, the lookup service 810 may search the user directories in a cloud-computing environment as shown in step 4.

At step 5, the lookup service 810 sends the search results to the backend application 808.

At step 6, the backend application 808 sends the search results to the front-end application, and the front-end application displays the search results to the end user 802.

In some other implementations, the Org-1 user can use the front-end OC application (e.g., BBME) to request an external contact search. The BBME front-end application can send the request to Org-1's BBME backend application, and Org-1's BBME backend application forwards the request to the OC server. The request can include the contact name for searching. Based on the stored connection information, the OC server can find the organizations that are connected to Org-1 using the BBME application. For each such connected organization, the OC server determines the subset of user directory visible to Org-1. The OC server can instruct the BBME backend application of the connected organization(s) to provide contact search results from the identified subset of user directory. For example, the OC server can send information of the identified subset of user directory and the contact name to the BBME backend application of each connected organization. The BBME backend application of each connected organization performs the contact name search within the identified subset of user directory and sends the search result back to the OC server. The OC server collects the search results from all the connected organizations and sends them to Org-1's BBME backend application, which further forwards the results to the front-end BBME application at the requesting Org-1 user. Org-1 and its connected organization(s) can share the same BBME backend application or each has its own BBME backend application.

Figure 9:
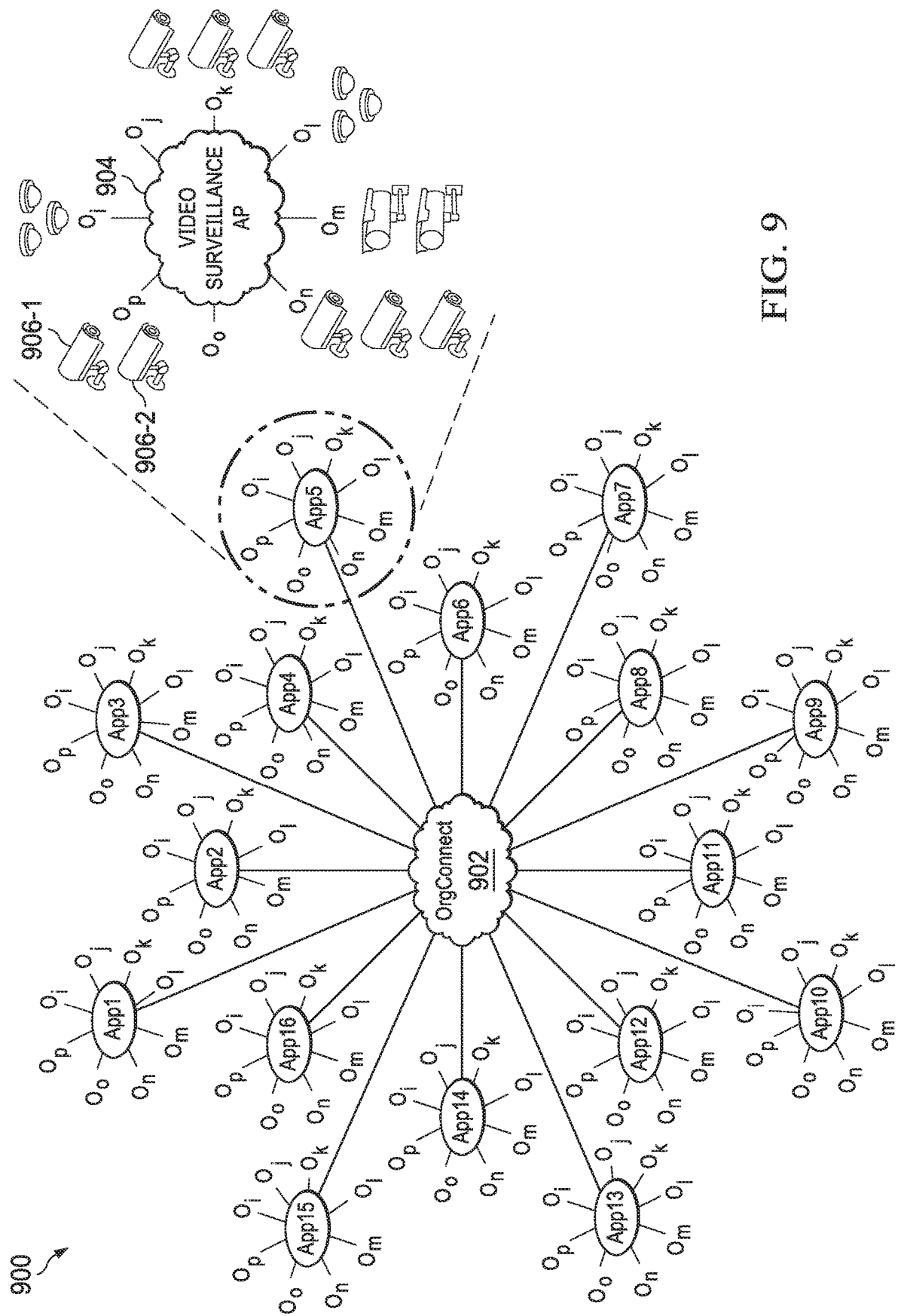
FIG. 9 illustrates an example OC system for device sharing according to some implementations.

FIG. 9 illustrates an example OC system 900 for device sharing according to some implementations. The OC system 900 includes an OC server 902 connected with a video surveillance application 904 that support camera sharing across multiple organizations such as organizations $O_i$ to $O_p$. For example, organization $O_o$ can access videos from cameras owned by organization $O_p$ (e.g., cameras 906-1 and 906-2). For instance, a police department may access videos from various locations such as department stores and hospitals to search criminals.

Below are two examples of using an OC application (e.g., a video management system (VMS) application) to access videos from external organizations. In the first example, the camera sharing is based on a request geographical area. For example, an Org-1 user uses the VMS front-end application to request surveillance videos of a geographical area (or feed area) from all Org-1 connected organizations. The VMS front-end application sends the request to Org-1's VMS backend application, and Org-1's VMS backend application forwards the request to the OC server. Based on the stored connection information, the OC server can find the organizations that are connected to Org-1 using the VMS application. For each such connected organization, the OC server determines which cameras are visible to Org-1 (an organization may only allow other organizations to access some of its cameras). The OC server can determine the subset of the cameras visible to Org-1 that cover the requested area. The OC server can instruct the VMS backend application of the connected organization(s) to provide the videos/images from the identified subset of cameras. In some cases, a list of cameras can be provided, so that the user can select one or more cameras for videos/images. In some cases, information associated of these cameras, e.g., location, resolution, type, can be provided in the list to help the user for the selection. The OC server can forward the provided videos/images to Org-1's VMS backend application, which further forwards the videos/images to the front-end VMS application at the requesting Org-1 user. Org-1 and its connected organization(s) can share the same VMS backend application or each has its own VMS backend application.

In a second example, the camera sharing is based on image recognition. For example, an Org-1 user uses the VMS front-end application to enter an image (e.g., a face of a suspect, a car, or a gun) and define a requested surveillance area (e.g., for searching a suspect in an area). The VMS front-end application sends the image and the requested area to Org-1's VMS backend application and Org-1's VMS backend application forwards the information to the OC server. Based on the stored connection information, the OC server finds the organizations that are connected to Org-1 using the VMS application with image recognition capability (some organizations may not have image recognition capability). For each such connected organization, the OC server determines which cameras are visible to Org-1. The OC server further determines the subset of the cameras visible to Org-1 that cover the requested area. The OC server then instructs the VMS application of the connected organization(s) to provide the feed once the image is recognized by the VMS application from the identified subset of cameras. The OC server can forward the provided feed to Org-1's VMS backend application, which further forwards the feed to the front-end VMS application at the requesting Org-1 user. Org-1 and its connected organization(s) can share the same VMS backend application or each has its own VMS backend application. In this communication it is possible that OrgConnect does not see the real pic or feed as encryption can be applied between the application backends.

Figure 13:
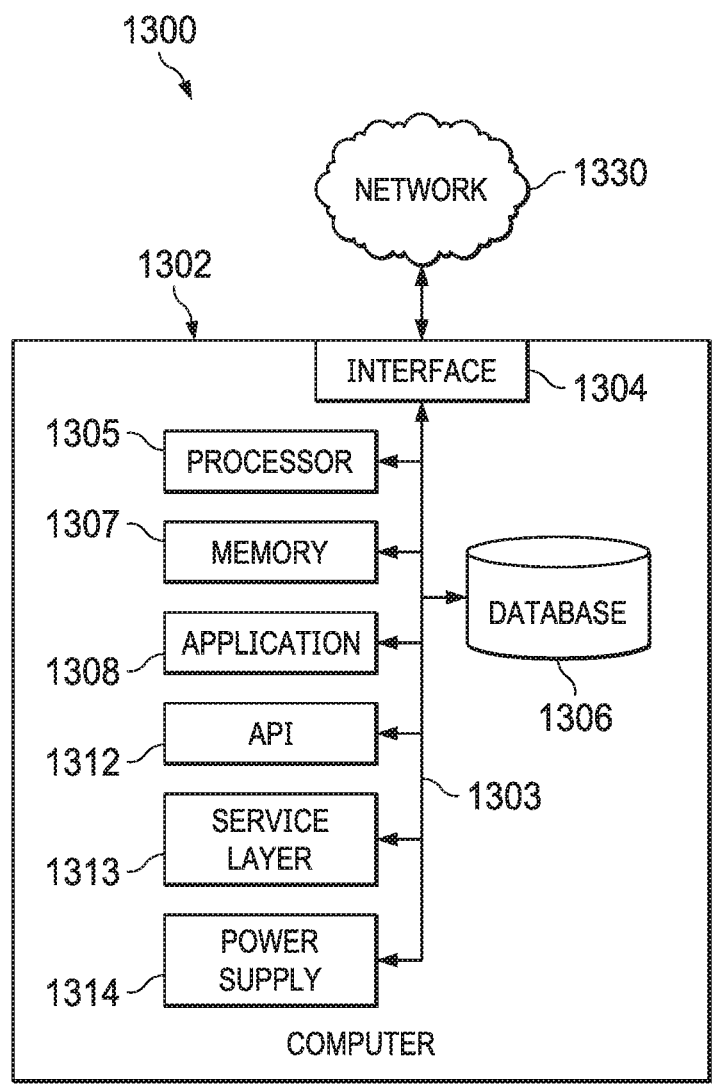
FIG. 13 is a block diagram illustrating an example of a computer-implemented system used to provide computational functionalities associated with described algorithms, methods, functions, processes, flows, and procedures, according to some implementations of the present disclosure.

FIG. 13 is a block diagram illustrating an example of a computer-implemented system 1300 used to provide computational functionalities associated with described algorithms, methods, functions, processes, flows, and procedures, according to an implementation of the present disclosure. In the illustrated implementation, system 1300 includes a computer 1302 and a network 1330. For example, the OC server 102 can be implemented by the computer 402.

The illustrated computer 1302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the computer 1302 can include an input device, such as a keypad, keyboard, touch screen, another input device, or a combination of input devices that can accept user information, and an output device that conveys information associated with the operation of the computer 1302, including digital data, visual, audio, another type of information, or a combination of types of information, on a graphical-type user interface (UI) (or GUI) or other UI.

The computer 1302 can serve in a role in a distributed computing system as a client, network component, a server, a database or another persistency, another role, or a combination of roles for performing the subject matter described in the present disclosure. The illustrated computer 1302 is communicably coupled with a network 1330. In some implementations, one or more components of the computer 1302 can be configured to operate within an environment, including cloud-computing-based, local, global, another environment, or a combination of environments.

At a high level, the computer 1302 is an electronic computing device operable to receive, transmit, process, store, or manage data and information associated with the described subject matter. According to some implementations, the computer 1302 can also include or be communicably coupled with a server, including an application server, e-mail server, web server, caching server, streaming data server, another server, or a combination of servers.

The computer 1302 can receive requests over network 1330 (for example, from a client software application executing on another computer 1302) and respond to the received requests by processing the received requests using a software application or a combination of software applications. In addition, requests can also be sent to the computer 1302 from internal users (for example, from a command console or by another internal access method), external or third-parties, or other entities, individuals, systems, or computers.

Each of the components of the computer 1302 can communicate using a system bus 1303. In some implementations, any or all of the components of the computer 1302, including hardware, software, or a combination of hardware and software, can interface over the system bus 1303 using an API 1312, a service layer 1313, or a combination of the API 1312 and service layer 1313. The API 1312 can include specifications for routines, data structures, and object classes. The API 1312 can be either computer-language independent or dependent and refer to a complete interface, a single function, or even a set of APIs. The service layer 1313 provides software services to the computer 1302 or other components (whether illustrated or not) that are communicably coupled to the computer 1302. The functionality of the computer 1302 can be accessible for all service consumers using the service layer 1313. Software services, such as those provided by the service layer 1313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 1302, alternative implementations can illustrate the API 1312 or the service layer 1313 as stand-alone components in relation to other components of the computer 1302 or other components (whether illustrated or not) that are communicably coupled to the computer 1302. Moreover, any or all parts of the API 1312 or the service layer 1313 can be implemented as a child or a sub-module of another software module, enterprise application, or hardware module without departing from the scope of the present disclosure.

The computer 1302 includes an interface 1304. Although illustrated as a single interface 1304, two or more interfaces 1304 can be used according to particular needs, desires, or particular implementations of the computer 1302. The interface 1304 is used by the computer 1302 for communicating with another computing system (whether illustrated or not) that is communicatively linked to the network 1330 in a distributed environment. Generally, the interface 1304 is operable to communicate with the network 1330 and includes logic encoded in software, hardware, or a combination of software and hardware. More specifically, the interface 1304 can include software supporting one or more communication protocols associated with communications such that the network 1330 or hardware of interface 1304 is operable to communicate physical signals within and outside of the illustrated computer 1302.

The computer 1302 includes a processor 1305. Although illustrated as a single processor 1305, two or more processors 1305 can be used according to particular needs, desires, or particular implementations of the computer 1302. Generally, the processor 1305 executes instructions and manipulates data to perform the operations of the computer 1302 and any algorithms, methods, functions, processes, flows, and procedures as described in the present disclosure.

The computer 1302 also includes a database 1306 that can hold data for the computer 1302, another component communicatively linked to the network 1330 (whether illustrated or not), or a combination of the computer 1302 and another component. For example, database 1306 can be an in-memory, conventional, or another type of database storing data consistent with the present disclosure. In some implementations, database 1306 can be a combination of two or more different database types (for example, a hybrid in-memory and conventional database) according to particular needs, desires, or particular implementations of the computer 1302 and the described functionality. Although illustrated as a single database 1306, two or more databases of similar or differing types can be used according to particular needs, desires, or particular implementations of the computer 1302 and the described functionality. While database 1306 is illustrated as an integral component of the computer 1302, in alternative implementations, catabase 1306 can be external to the computer 1302.

The computer 1302 also includes a memory 1307 that can hold data for the computer 1302, another component or components communicatively linked to the network 1330 (whether illustrated or not), or a combination of the computer 1302 and another component. Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307, two or more memories 1307 or similar or differing types can be used according to particular needs, desires, or particular implementations of the computer 1302 and the described functionality. While memory 1307 is illustrated as an integral component of the computer 1302, in alternative implementations, memory 1307 can be external to the computer 1302.

The application 1308 is an algorithmic software engine providing functionality according to particular needs, desires, or particular implementations of the computer 1302, particularly with respect to functionality described in the present disclosure. For example, application 1308 can serve as one or more components, modules, or applications. Further, although illustrated as a single application 1308, the application 1308 can be implemented as multiple applications 1308 on the computer 1302. In addition, although illustrated as integral to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion or management circuits (including recharging, standby, or another power management functionality). In some implementations, the power supply 1314 can include a power plug to allow the computer 1302 to be plugged into a wall socket or another power source to, for example, power the computer 1302 or recharge a rechargeable battery.

There can be any number of computers 1302 associated with, or external to, a computer system containing computer 1302, each computer 1302 communicating over network 1330. Further, the term "client," "user," or other appropriate terminology can be used interchangeably, as appropriate, without departing from the scope of the present disclosure. Moreover, the present disclosure contemplates that many users can use one computer 1302, or that one user can use multiple computers 1302.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

In addition, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A method, comprising:
    receiving, at a server, a contact search request from an application of a first organization, the contact search request including contact information, wherein the application supports one or more services including a contact search service;
    determining a second organization, wherein the second organization is connected to the first organization to enable a user of the first organization to search a user directory of the second organization;
    determining a subset of the user directory of the second organization that can be searched by the user of the first organization;
    transmitting, to the application of the second organization, the contact information and information of the determined subset of the user directory of the second organization;
    receiving a contact search result from the application of the second organization;
    transmitting the received contact search result to the application of the first organizations;
    receiving, from a client device of the first organization, a request to set up a connection between the first organization and the second organization, the request including the application;
    transmitting, to the client device of the first organization, a collaboration template associated with the application;
    receiving, from the client device of the first organization, a connection agreement based on the collaboration template, the connection agreement including separate sections for each of the one or more services;
    transmitting the connection agreement to a client device of the second organization;
    receiving, from the client device of the second organization, an indication that the second organization accepts the connection agreement; and
    storing, at the server, connection information for the connection between the first organization and the second organization, the connection information including the connection agreement, and information of the first organization and the second organization.

2. The method of claim 1, wherein the first organization and the second organization are registered to the server, and the server includes a directory of registered organizations.

3. The method of claim 1, wherein the application is registered to the server.

4. The method of claim 1, wherein the application is a device-sharing application or a resource-sharing application.

5. The method of claim 1, wherein the server determines the subset of the user directory of the second organization based on a section of the connection agreement that corresponds to the contact search service.

6. The method of claim 1, wherein the collaboration template is signed by the application and the connection agreement is signed by the first organization, the second organization and the server.

7. The method of claim 1, wherein the information of the first organization and the second organization included in the connection information comprises at least one of organization connectivity information or connection history information.

8. The method of claim 1, wherein the connection agreement comprises a number of users, a type of users, a number of resources, or type of resources.

9. A non-transitory computer-readable medium storing instructions which, when executed, cause a computing device to perform operations comprising:
    receiving, at a server, a contact search request from an application of a first organization, the contact search request including contact information, wherein the application supports one or more services including a contact search service;
    determining a second organization, wherein the second organization is connected to the first organization to enable a user of the first organization to search a user directory of the second organization;
    determining a subset of the user directory of the second organization that can be searched by the user of the first organization;
    transmitting, to the application of the second organization, the contact information and information of the determined subset of the user directory of the second organization;
    receiving a contact search result from the application of the second organization;
    transmitting the received contact search result to the application of the first organization;
    receiving, from a client device of the first organization, a request to set up a connection between the first organization and the second organization, the request including the application;
    transmitting, to the client device of the first organization, a collaboration template associated with the application;
    receiving, from the client device of the first organization, a connection agreement based on the collaboration template, the connection agreement including separate sections for each of the one or more services;
    transmitting the connection agreement to a client device of the second organization;
    receiving, from the client device of the second organization, an indication that the second organization accepts the connection agreement; and
    storing, at the server, connection information for the connection between the first organization and the second organization, the connection information including the connection agreement, and information of the first organization and the second organization.

10. The non-transitory computer-readable medium of claim 9, wherein the first organization and the second organization are registered to the server, and the server includes a directory of registered organizations.

11. The non-transitory computer-readable medium of claim 9, wherein the application is registered to the server.

12. The non-transitory computer-readable medium of claim 9, wherein the application is a device-sharing application or a resource-sharing application.

13. The non-transitory computer-readable medium of claim 9, wherein the server determines the subset of the user directory of the second organization based on a section of the connection agreement that corresponds to the contact search service.

14. The non-transitory computer-readable medium of claim 9, wherein the collaboration template is signed by the application and the connection agreement is signed by the first organization, the second organization and the server.

15. The non-transitory computer-readable medium of claim 9, wherein the information of the first organization and the second organization included in the connection information comprises at least one of organization connectivity information or connection hi story information.

16. The non-transitory computer-readable medium of claim 9, wherein the connection agreement comprises a number of users, a type of users, a number of resources, or type of resources.

17. A device, comprising:
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
   receiving, at a server, a contact search request from an application of a first organization, the contact search request including contact information, wherein the application supports one or more services including a contact search service;
   determining a second organization, wherein the second organization is connected to the first organization to enable a user of the first organization to search a user directory of the second organization;
   determining a subset of the user directory of the second organization that can be searched by the user of the first organization;
   transmitting, to the application of the second organization, the contact information and information of the determined subset of the user directory of the second organization;
   receiving a contact search result from the application of the second organization;
   transmitting the received contact search result to the application of the first organization;
   receiving, from a client device of the first organization, a request to set up a connection between the first organization and the second organization, the request including the application;
   transmitting, to the client device of the first organization, a collaboration template associated with the application;
   receiving, from the client device of the first organization, a connection agreement based on the collaboration template, the connection agreement including separate sections for each of the one or more services;
   transmitting the connection agreement to a client device of the second organization;
   receiving, from the client device of the second organization, an indication that the second organization accepts the connection agreement and
   storing, at the server, connection information for the connection between the first organization and the second organization, the connection information including the connection agreement, and information of the first organization and the second organization.

* * * * *